United States Patent
Kawakami et al.

(10) Patent No.: US 7,257,235 B2
(45) Date of Patent: Aug. 14, 2007

(54) MONITORING APPARATUS, MONITORING METHOD, MONITORING PROGRAM AND MONITORING PROGRAM RECORDED RECORDING MEDIUM READABLE BY COMPUTER

(75) Inventors: Yuichi Kawakami, Nishinomiya (JP); Tomoyuki Terada, Toyonaka (JP); Kyoko Nakamura, Toyonaka (JP); Ken Yoshii, Itami (JP); Yasuhisa Kinto, Neyagawa (JP)

(73) Assignee: Minolta Co., Ltd., Osaka (JP)

( * ) Notice: Subject to any disclaimer, the term of this patent is extended or adjusted under 35 U.S.C. 154(b) by 878 days.

(21) Appl. No.: 10/375,616

(22) Filed: Feb. 27, 2003

(65) Prior Publication Data

US 2003/0227548 A1 Dec. 11, 2003

(30) Foreign Application Priority Data

| Feb. 28, 2002 | (JP) | ............................. 2002-054566 |
| Feb. 28, 2002 | (JP) | ............................. 2002-054567 |
| Feb. 28, 2002 | (JP) | ............................. 2002-054568 |

(51) Int. Cl.
*G06K 9/00* (2006.01)

(52) U.S. Cl. ...................................... 382/103; 348/155
(58) Field of Classification Search ................ 382/103, 382/104, 107; 348/143, 152, 155
See application file for complete search history.

(56) References Cited

U.S. PATENT DOCUMENTS

| 6,335,976 B1* | 1/2002 | Belmares .................... 382/103 |
| 6,760,063 B1* | 7/2004 | Kamei ..................... 348/211.8 |
| 2001/0002843 A1* | 6/2001 | Yata ........................... 348/169 |
| 2003/0103648 A1* | 6/2003 | Ito et al. ..................... 382/103 |

FOREIGN PATENT DOCUMENTS

| JP | 2000-059762 A | 2/2000 |
| JP | 2000-083243 A | 3/2000 |

* cited by examiner

*Primary Examiner*—Andrew W. Johns

(57) ABSTRACT

A monitoring apparatus according to the present invention has an image taking section which captures images of a plurality of image capturing areas, a detecting section which detects an object to be monitored based on an image obtained by the image taking section, a command receiving section which receives a command for remote control, and a command executing section which executes a process corresponding to the received command when the object is not detected by the detecting section.

9 Claims, 13 Drawing Sheets

MONITORING APPARATUS, MONITORING METHOD, MONITORING PROGRAM AND MONITORING PROGRAM RECORDED RECORDING MEDIUM READABLE BY COMPUTER

CROSS-REFERENCE TO RELATED APPLICATION

This application is based on Japanese Patent Applications Nos. 2002-54566, 2002-54567 and 2002-54568 filed in Japan on Feb. 28, 2002, the entire content of which is hereby incorporated by reference.

BACKGROUND OF THE INVENTION

1. Field of the Invention

The present invention relates to a monitoring apparatus, a monitoring method, a monitoring program and a monitoring program recorded recording medium readable by a computer. Particularly, the invention relates to the monitoring apparatus for finding and tracking an object intruded in an area to be monitored, the monitoring method, the monitoring program and the monitoring program recorded recording medium readable by a computer.

2. Description of the Related Art

Conventionally, a monitoring apparatus for finding an object (including a person) intruded in an area to be monitored is known. The conventional monitoring apparatus processes an image obtained by capturing an image of an area to be monitored, so as to detect (find) an object intruded in the monitoring area. Such a kind of the monitoring apparatus executes a process for finding an intruded object and a tracking process for changing an image taking direction of a camera so that the found object is within the image capturing area and simultaneously capturing an image of the object.

In addition, such a monitoring apparatus can be remotely controlled in a place where a user has gone separated from a house where the monitoring apparatus is installed. For example, a mobile information terminal is connected with the monitoring apparatus via a public line from a place where the user has gone and a predetermined remote control command is transmitted to the monitoring apparatus, so that the monitoring apparatus can be controlled from the information terminal. The monitoring apparatus is remotely controlled in such a manner, so that a condition in the house captured by the monitoring apparatus can be watched in the place where the user has gone.

Such a conventional monitoring apparatus performs an operation for finding an object intruded in a monitoring area, an operation for tracking the found object, an operation for recording an image obtained by capturing an image of the found object, an operation for amply capturing an image of the found object, and the like. However, in the case where such a conventional monitoring apparatus receives the remote control command from the information terminal connected with the monitoring apparatus even while it is performing the monitoring operation, it executes the remote control command. For this reason, while the monitoring apparatus is finding the object and recording its image, it receives the remote control command, thereby arising a problem that the recording is stopped and important information is not recorded.

In addition, as a technique for detecting an object from an captured image in the conventional monitoring apparatus, (1) a background image differential process, (2) a color extracting process and (3) a time differential process are known.

In the background image differential process (1), a background area is previously specified, and an image of the background area is captured by the monitoring apparatus to be stored. Then, the monitoring apparatus captures a current image of the background area and detects an area which does not exist in the stored background image based upon a difference between the current image of the background area and the stored image of the background area. This process has an advantage that even a still object can be detected, but it has a disadvantage such that-in the case where an environment such as an illumination or a sunlight is different between a point of time at which the background image has been previously captured and the current point of time, an entire image is different, and thus accurate detection cannot be executed.

(2) The color extracting process detects a specified color, for example, a skin color of a person from an image. Since a specified color which has been preset is extracted from an image, the process has an advantage that an area of the specified color can be extracted accurately. However, it has a disadvantage that only a specified color which has been preset can be extracted.

(3) The time differential process calculates a difference between a plurality of images captured at predetermined comparatively short time intervals and detects an area where a change occurs. Since images which has been captured at comparatively shorter intervals than that in the background image differential process, this process has an advantage that it is hardly influenced by a change in environment. However, on the contrary, since images captured at short intervals are compared with one another, this process has a disadvantage that a still object which hardly move for the short intervals cannot be detected.

Namely, the conventional monitor apparatus uses only one of the above-mentioned image processes, it has a problem of detecting accuracy. Namely, the monitoring apparatus using the background differential process has the problem that an object cannot be detected accurately in a monitoring area where a change in environment is intensive. The monitoring apparatus using the color extracting process has a problem that an object having a color different from a predetermined color cannot be detected. The monitoring apparatus using the time differential process has a problem that a still object cannot be detected.

Further, in the case where after an object position is detected by the background image differential process, the found object is tried to be tracked, the object position in a next position cannot be detected if a background image for the object position is not previously obtained. For this reason, background images from various directions should be previously obtained. As a result, there arises a problem that a storage capacity of the background images becomes enormous.

Therefore, the conventional monitoring apparatus adopts a time difference tracking method of, after detecting an area of a moving object by means of the time differential process, tracking the area. In the time difference tracking, since it is not necessary to previously store a background image, it is not necessary to store a lot of background images. However, in the time difference tracking, when an object stops, a difference cannot be obtained, thereby still arising a problem that the object position cannot be detected.

SUMMARY OF THE INVENTION

It is a main object of the present invention to provide a monitoring apparatus which is capable of performing a monitoring operation securely, a monitoring method and a monitoring program.

It is another object of the invention to provide a monitoring apparatus in which accuracy in finding an object or accuracy in tracking the found object is improved.

It is still another object of the invention to provide a monitoring apparatus which is capable of tracking a difference between background images with less storage amount of background images, a monitoring method, a monitoring program and a monitoring program recorded recording medium readable by a computer.

The main object of the present invention is achieved by providing a monitoring apparatus comprising, an image taking section which captures images of a plurality of image capturing areas, a detecting section which detects an object to be monitored based on an image obtained by the image taking section, a command receiving section which receives a command for remote control; and a command executing section which executes a process corresponding to the received command when the object is not detected by the detecting section.

Another object of the present invention is achieved by providing a monitoring apparatus comprising an image taking section which captures images of a plurality of image capturing areas, a detecting section which provides a plurality of detecting methods respectively for detecting an object to be monitored based on an image obtained by the image taking section, and a selecting section which selects one of said detecting methods for each of the plural image capturing areas in order to detect the object.

Still another object of the present invention is achieved by providing a monitoring apparatus having an image taking section which captures an image of a predetermined monitoring area, a first angle of view control section which changes an angle of view of the image taking section so that said predetermined monitoring area is divided into a plurality of background areas and an image of each background area is captured by said image taking section, a storage section which stores the image of each background area, a change area obtaining section which obtains an object area nonexistent at the time of capturing the stored image of one background area based on the current image of said one background area and the stored image of the one background area, and a second angle of view control section which changes an angle of view of the image taking section in order to capture an image of a background area adjacent to the one background area when the object area moves from the one background area toward the adjacent background area.

BRIEF DESCRIPTION OF DRAWINGS

These and other objects, advantages and features of the invention will become apparent from the following description thereof taken in conjunction with the accompanying drawings in which.

DESCRIPTION OF THE PREFERRED EMBODIMENTS

Figure 1:
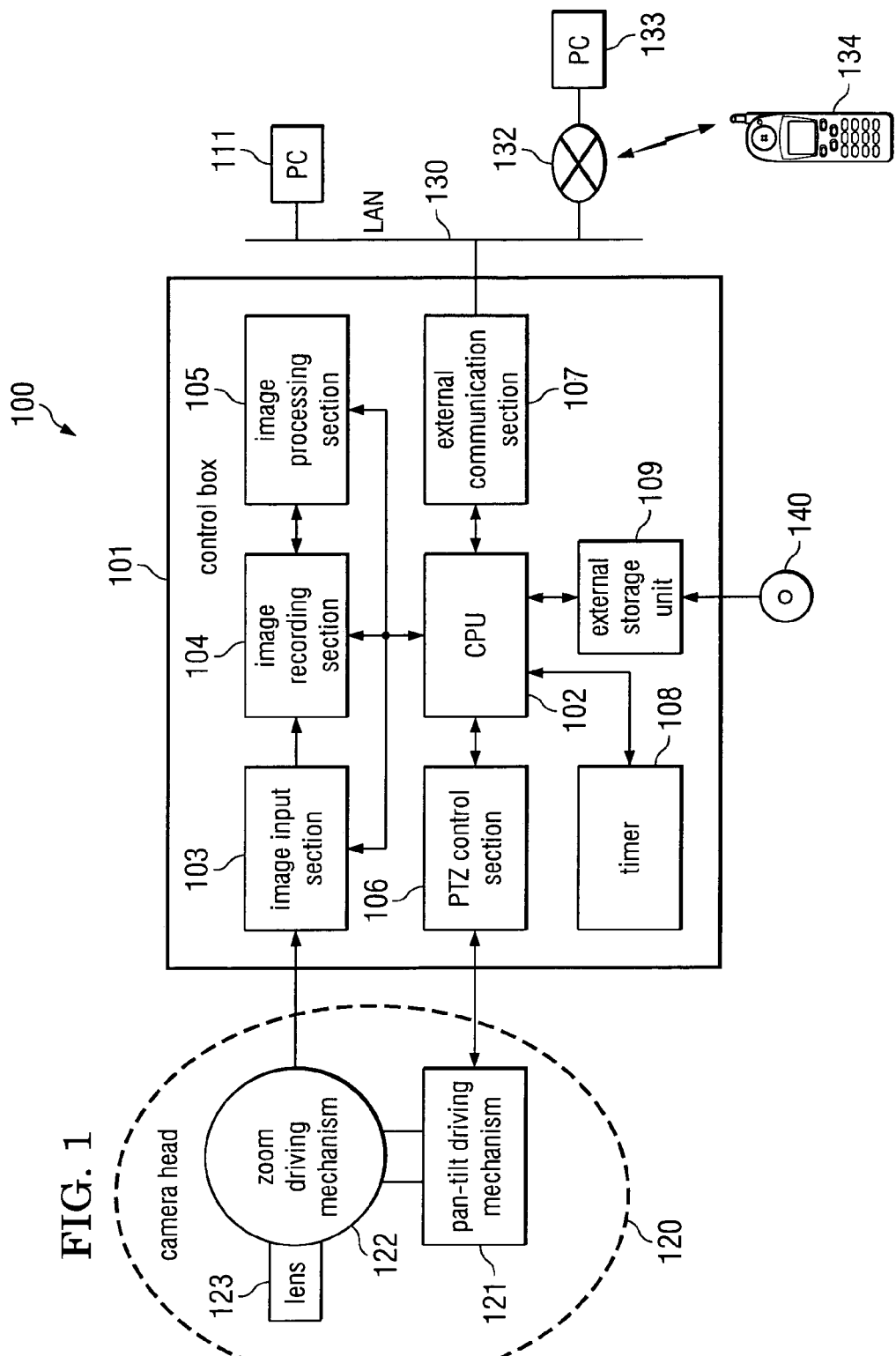
FIG. 1 is a diagram showing a schematic structure of a monitoring apparatus according to one embodiment of the present invention.

There will be explained below a monitoring apparatus according to embodiments of the present invention with reference to the accompanying drawings. In the following explanation, like parts and components are designated by like reference numerals. Their names and functions are the same. Therefore, detailed description thereof is not repeated.

FIG. 1 is a diagram showing a schematic structure of the monitoring apparatus according to one embodiment of the present invention. With reference to FIG. 1, the monitoring apparatus 100 is composed of a camera head 120 and a control box 101. The camera head 120 includes a charge-coupled device (CCD) for capturing an image capturing possible range and outputting its image, a pan-tilt driving mechanism 121 for changing an image taking direction of a camera to horizontal and vertical directions, a zoom driving mechanism 122 for adjusting an image taking magnification, and lens 123.

The control box 101 includes a central processing unit (CPU) 102, an image input section 103, an image processing section 105, an image recording section 104, a PTZ (Pan-Tilt-Zoom) control section 106, a timer 108, an external communication section 107, and an external storage unit 109. The central processing unit 102 controls the entire monitoring apparatus 100. The image input section 103 captures an image output from CCD of the camera head 120. The image processing section 105 processes the captured image. The image recording section 104 stores the captured image or an image processed by the image processing section 105. The PTZ control section 106 controls the pan-tilt driving mechanism 121 and the zoom driving mechanism 122 of the camera head 102 according to an instruction from the CPU 102. The timer 108 contains a clock and provides times information to the CPU 102. The external communication section 107 communicates with an external information communication terminal and a personal computer via a local area network (LAN) 130. The external storage unit 109 reads programs, data and the like recorded in a recording medium 140 or writes necessary data into the recording medium 140.

The CPU 102 executes a program stored previously therein so as to execute a monitoring process, mentioned later.

The image input section 103 receives an image output from the CCD of the camera head 120 so as to transmit it to the image storage section 104.

The image recording section 104 is capable of recording a dynamic image received by the image input section 103 and recording a still image. The image recording section 104 is a ring buffer, and in the case where it records the dynamic image input by the image input section 103, it is capable of recording a current image received by the image input section 103 through an image before the time predated by a predetermined period. The image recording section 104 records also a background image, mentioned later.

The PTZ control section 106 controls the pan-tilt driving mechanism 121 and the zoom driving mechanism 122 of the camera head 120 according to an instruction from the CPU 102, so as to change an image taking direction using the lens 123 and image taking magnification of the lens 123. An angle of view of the camera head 120 is determined by the image taking direction using the lens 123 and the image taking magnification of the lens 123. Therefore, the PTZ control section 106 controls the angle of view of the camera head 120.

The storage unit 109 reads a program and data recorded in the recording medium 140 readable by a computer according to an instruction from the CPU 102, and writes necessary information such as setting values set by remote operation, mentioned later, on the monitoring apparatus 100.

The computer-readable recording medium 140 includes media, such as a magnetic tape, a cassette tape, and semiconductor memories such as a magnetic disk, an optical disk (CD-ROM/MO/MD/DVD and the like), an IC card (including a memory card), an optical card, a mask, ROM, EPROM, EEPROM and a flash memory, for holding programs fixedly. Moreover, the recording medium 140 includes a recording medium for holding a program fluidly so that a program is downloaded from a network.

The program here includes not only a program which is capable of being executed directly by the CPU 102 but also a source program type program, a compressed program, an encrypted program and the like.

The external communication section 107 is connected with the LAN 130. For this reason, communication is possible between a personal computer (PC) 131 and the CPU 102 connected by the LAN 130. As a result, a user of the PC 131 can remotely operate the camera head 120. Moreover, the user of the PC 131 remotely operates the camera head 120 so as to be capable of watching an image captured by the camera head 120 on a display of the PC 131. Further, the user can input set information which is necessary for the case where the monitoring apparatus 100 performs the monitoring operation from the PC 131. The set values set in such a manner are stored in the storage unit 109.

The monitoring apparatus 100 can be remotely operated similarly from a PC 133, a mobile phone or a PDA 134 connected with the LAN 130 via an internet 132 instead of the PC 131.

The example that the external communication section 107 is connected with the LAN 130 has been explained, but the external communication section 107 may be connected with a general public line via a modem. In this case, the monitoring apparatus 100 can be remotely operated from another PC connected with the general public line.

The external communication section 107 executes an authorizing process using a user ID and a password so as to limit users of the monitoring apparatus 100. As a result, only a person who has the authority to remotely operate the monitoring apparatus 100 can remotely operate the monitoring apparatus 100.

Figure 2:
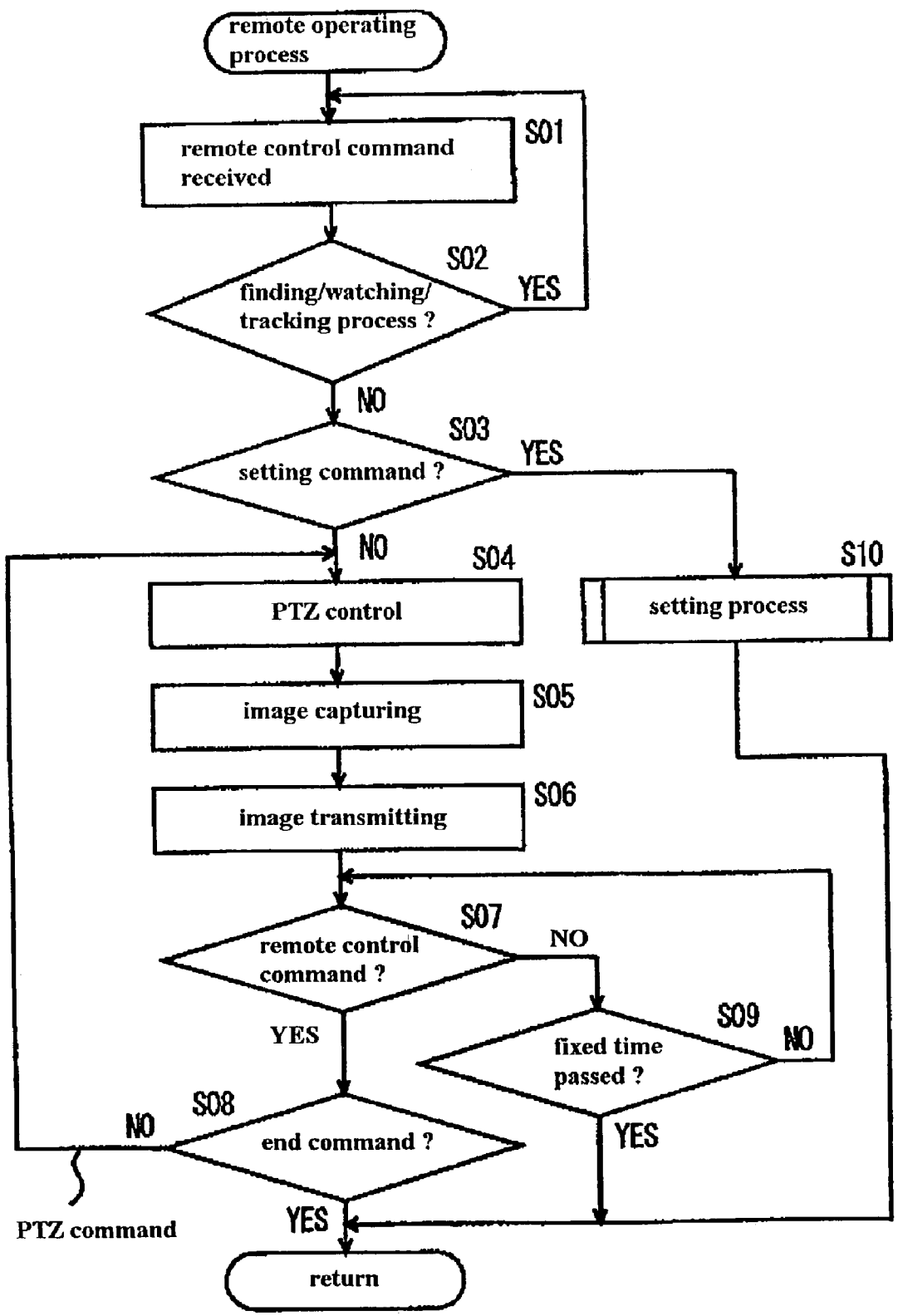
FIG. 2 is a flowchart showing a flow of a remote operating process to be executed by the monitoring apparatus according to the present embodiment.
Figure 3:
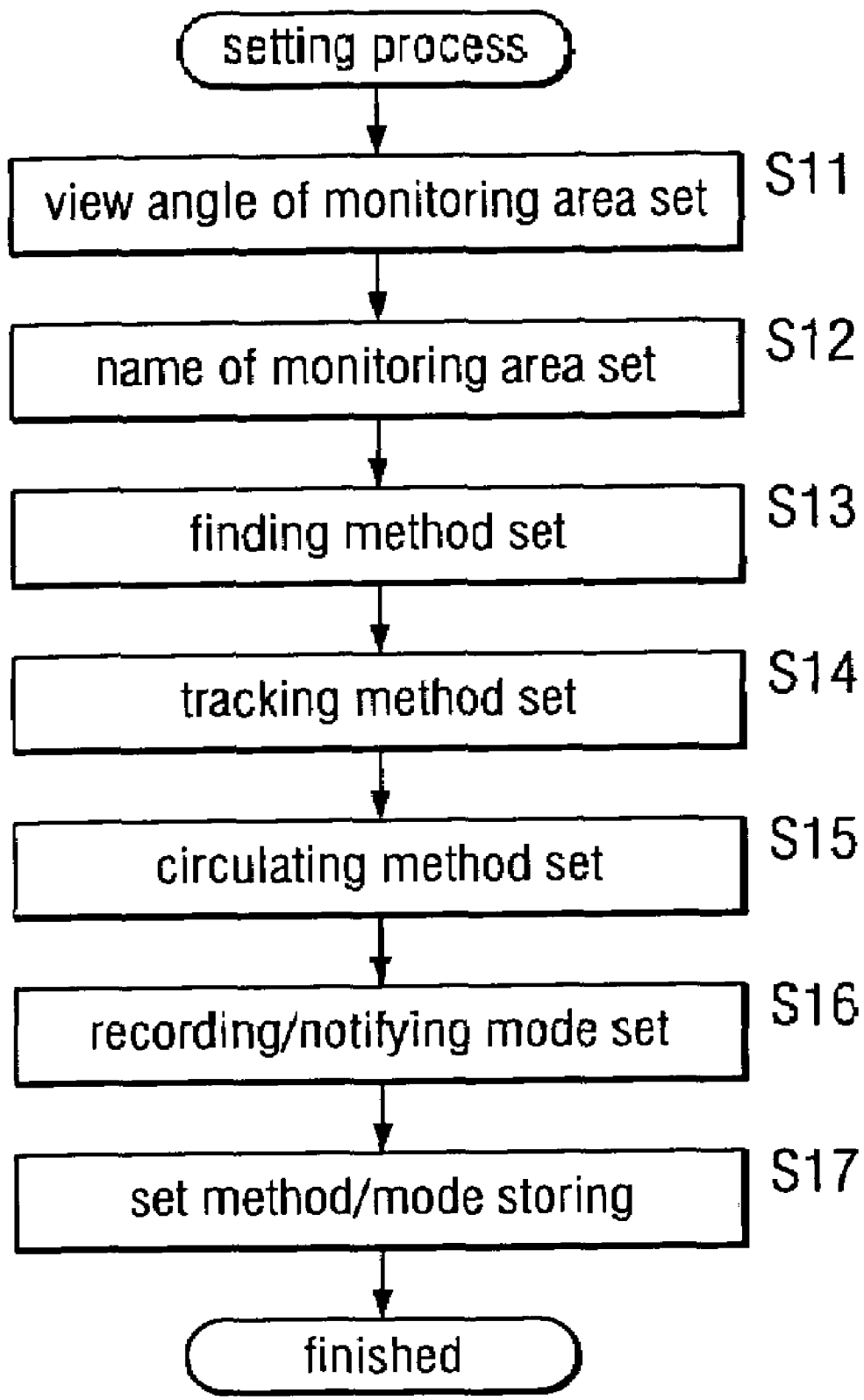
FIG. 3 is a flowchart showing a flow of a setting process to be executed by the monitoring apparatus according to the present embodiment.
Figure 4:
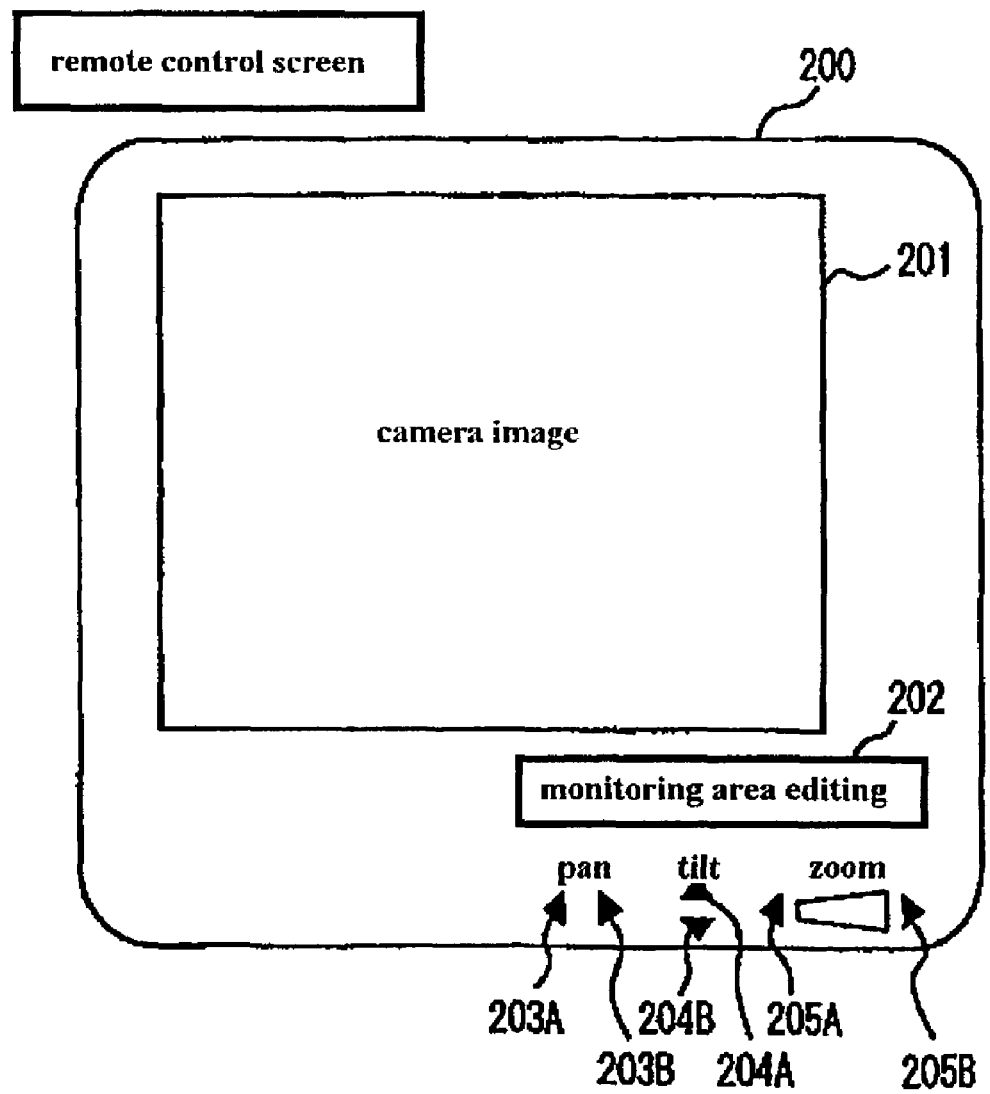
FIG. 4 is a diagram showing one example of a remote control screen to be output by the monitoring apparatus.
Figure 5:
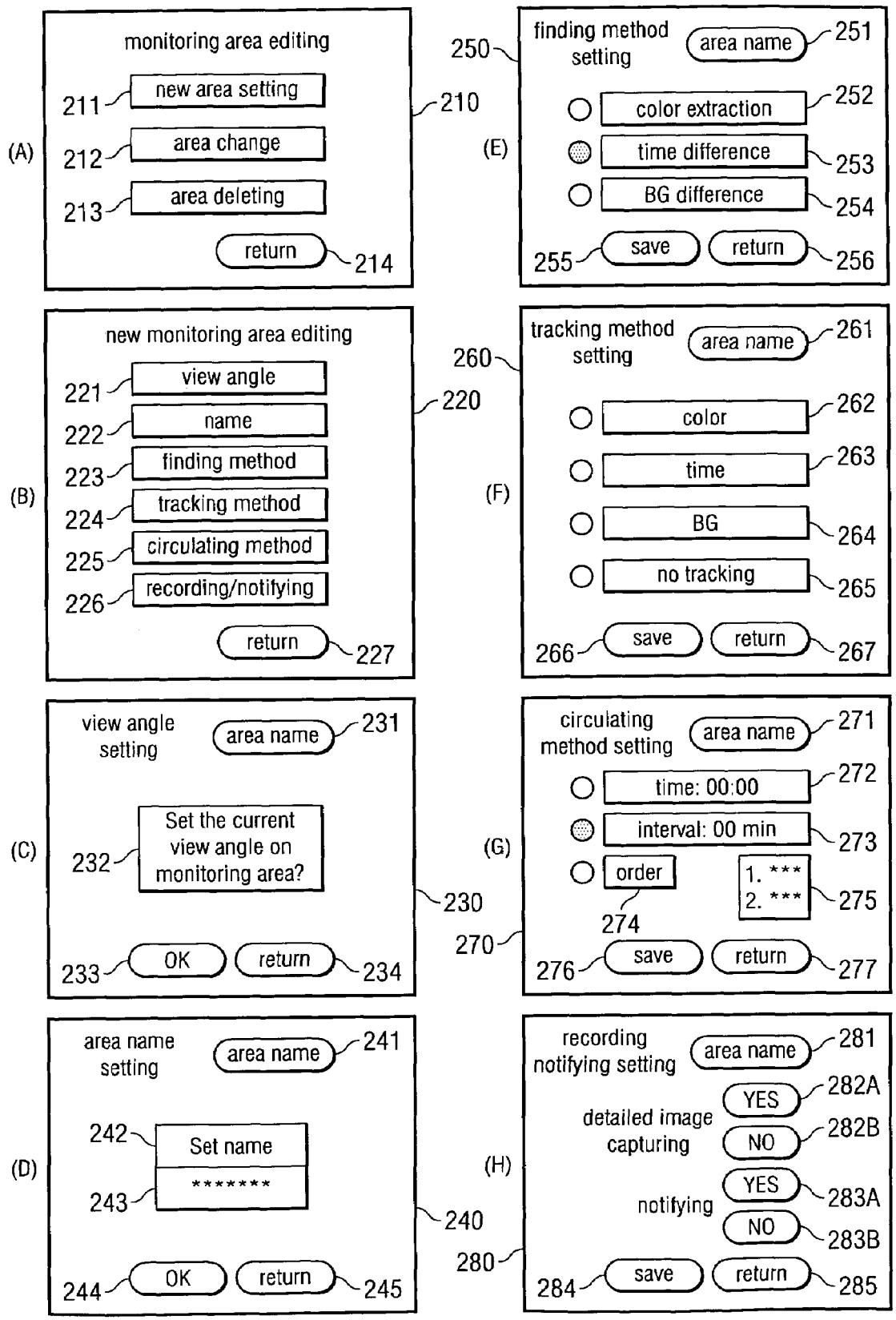
FIGS. 5(A) through 5(H) are diagrams respectively showing examples of a mode setting screen to be output by the monitoring apparatus.

There will be explained below the remote operation to be performed in the monitoring apparatus 100 according to the present embodiment with reference to FIGS. 2, 3, 4 and 5. FIG. 2 is a flowchart showing a flow of the remote operating process to be performed in the monitoring apparatus 100 according to the present embodiment. FIG. 3 is a flowchart showing a flow of the setting process to be performed in the monitoring apparatus according to the present embodiment. FIG. 4 is a diagram showing one example of a remote control screen output by the monitoring apparatus 100. FIGS. 5(A) through 5(H) are diagrams showing examples of a mode setting screen output by the monitoring apparatus 100. Here, the explanation will be given as for the case where the monitoring apparatus 100 is remotely operated by using the PC 131 connected with the LAN 130.

As shown in FIG. 2, the remote operating process is started when interruption occurs in the case where the monitoring apparatus 100 receives a remote control command such as "pan", "tilt" or "zoom" (step S01). When the monitoring apparatus 100 receives the remote control command, interruption occurs, and the process goes to step S02. When the monitoring apparatus 100 does not receive the remote control command, interruption does not occur so that the remote operating process is not executed. The remote control command is received by the external communication section 107. There will be explained here the case where the remote control command is transmitted from the PC 131 connected with the external communication section 107 via the LAN 130. The PC 131 is connected with the external communication section 107 via the LAN 130. The monitoring apparatus 100 is a web server and a client actuates a browser software in the PC 131, so that a server client system may be structured.

At step S02 a judgment is made as to whether the process which is currently executed in the monitoring apparatus 100 is a finding process, a watching process, or a tracking process. When the process is one of the finding process, the watching process and the tracking process, the process returns to step S01, and when not, the process goes to step S03.

As a result, even if the remote control command is received, when the monitoring apparatus 100 executes the finding process, the watching process or the tracking process, it does not execute the process based on the remote control command but executes the process which is currently executed continuously. That is, even if the remote control command is received during either of the finding process, the watching process or the tracking process is executed, the finding process, the watching process or the tracking process is not stopped. The finding process, the watching process or the tracking process can be executed to the end. As a result, when a change occurs such that an intruder appears in a monitoring area, the intruder can be found, watched or tracked securely.

When the remote control command is received, while the finding process, the watching process or the tracking process is being executed, the process based on the remote control command is not executed. However, while the finding process, the watching process or the tracking process is being executed, receiving of the remote control command may be rejected.

At step S03 the monitoring apparatus 100 transmits a remote control screen 200 to the PC 131 shown in FIG. 4. The remote control screen 200 is a web page and is received by the browser software of the PC 131 to be browsed. The remote control screen 200 includes an area 201, a monitoring area editing button 202, buttons 203A, 203B, 204A and 204B, and buttons 205A and 205B. An image which is captured and output by the CCD of the camera head 120 is displayed on the area 201. The monitoring area editing button 202 calls a screen for editing the monitoring area. The buttons 203A, 203B, 204A and 204B transmit a remote control command for controlling the pan-tilt driving mechanism 121 of the camera head 120. The buttons 205A and 205B transmit a remote control command for controlling the zoom driving mechanism 122.

The pan buttons 203A and 203B are transmission buttons for determining an image taking direction of the camera head 120 to a horizontal direction. When the pan button 203A is indicated by a pointer such as a mouse, the remote control command is transmitted to the monitoring apparatus 100, so that the pan-tilt driving mechanism 121 is controlled by the PTZ control section 106, and the image taking direction of the lens 123 moves to the left direction. Moreover, the pan button 203B is indicated by a pointer such as a mouse so that the remote control command is transmitted to the monitoring apparatus 100, and the pan-tilt driving mechanism 121 is controlled by the PTZ control section 106 so that the image taking direction of the lens 123 moves to the right direction.

The tilt buttons 204A and 204B are buttons for moving the lens 123 of the camera head 120 to a vertical direction. The tilt button 204A is indicated by a pointer such as a mouse so that the remote control command is transmitted to the monitoring apparatus 100, and the zoom driving mechanism 122 is controlled by the PTZ control section 106 so that the image taking direction of the lens 123 moves upward. Similarly the tilt button 204B is indicated by a pointer such as a mouse so that the remote control command is transmitted to the monitoring apparatus 100, and the zoom driving mechanism 122 is controlled by the PTZ control section 106 so that the image taking direction of the lens 123 moves downward.

The zoom buttons 205A and 205B are buttons for changing image taking magnification of the lens 123. The zoom button 205A is indicated by a pointer such as a mouse so that the remote control command is transmitted to the monitoring apparatus 100, and the zoom driving mechanism 122 is controlled by the PTZ control section 106 so that the image taking magnification of the lens 123 becomes small. Moreover, the zoom button 205B is indicated by a pointer such as a mouse so that the remote control command is transmitted to the monitoring apparatus 100, and the zoom driving mechanism 122 is controlled by the PTZ control section 106 so that the image taking magnification of the lens 123 becomes large.

At step S03 after the remote control screen 200 is transmitted to the PC 131, a judgment is made as to whether a setting command is input. The setting command is input to the monitoring apparatus 100 by indicating the monitoring area editing button 202 of the remote control screen 200 using a pointer such as a mouse. When the setting command is input, the process goes to step S10, and when not, goes to step S04.

At step S10 the setting process is executed (step S10). When the setting process is ended, the remote operating process is ended.

When the setting command is not input, the process goes to step S04, and the PTZ control is performed based on the remote control command for changing an angle of view of the camera head 120 such as "pan", "tilt" or "zoom". Namely, when the monitoring apparatus 100 receives the remote control command such as "pan", "tilt" and "zoom" from the PC131, the PTZ control section 106 controls the pan-tilt driving mechanism 121 and the zoom driving mechanism 122, so that the image taking direction and the image taking magnification of the lens 123 are changed.

As a result, the angle of view of the camera head 120 is changed. An image of the image capturing area which is determined by the changed angle of view is captured by CCD of the camera head 120 (step S05). The captured camera image is transmitted as an area 201 of the remote control screen 200 to the PC 131 (step S06).

Thereafter, a judgment is made as to whether the remote control command such as "pan", "tilt" and "zoom" is received continuously (step S07). When the remote control command (PTZ command) of "pan", "tilt" and "zoom" is received, the process returns to step S04, and the steps at S04, S05 and S06 are repeated. When the remote control command (PTZ command) of "pan", "tilt" and "zoom" is not received, a judgment is made as to whether predetermined time has passed without receiving the remote control command of "pan", "tilt" and "zoom" (step S09). When the predetermined time has not passed, the process returns to step S07. Therefore, a wait state is kept until the predetermined time passes without receiving the remote control command of "pan", "tilt" and "zoom". Meanwhile, when the predetermined time has passed without receiving the control command of "pan", "tilt" and "zoom" (YES at step S09), the process is ended.

Meanwhile, at step S08 a judgment is made as to whether an end command is received, and when the end command is received, the process is ended. When not, it is a PTZ command, and thus the process returns to step S04 so that the steps S04, S05 and S06 are repeated.

As explained above, in the case where the setting process is ended (after step S10), when the end command is input (YES at step S08), or when a command is not input for predetermined time (YES at step S09), the remote operating process is ended. Since the remote operating process is started by interruption, when the remote operating process is ended, the angle of view of the camera head 120 is returned to an angle of view in the monitoring area at the time of the occurrence of interruption so that the monitoring operation is restored.

The user of the PC 131 watches an image displayed on the area 201 and simultaneously operates the pan buttons 203A and 203B, the tilt buttons 204A and 204B and the zoom buttons 205A and 205B in such a manner, so that the angle of view (pan, tilt, zoom) is set. For this reason, the user of the PC 131 can watch an image captured from an arbitrary direction which the user wants to watch.

Next, there will be explained below details of the setting process to be executed at step S10 with reference to FIGS. 3 and 5(A) through 5(H). In the setting process, firstly the monitoring area editing screen shown in FIG. 5(A) is superposed on the remote control screen shown in FIG. 4 or is displayed on an area different from the remote control screen 200.

As shown in FIG. 5(A), the monitoring area editing screen 210 includes a new monitoring area setting button 211, a monitoring area setting change button 212, a monitoring area deleting button 213, and a back button 214.

The new monitoring area setting button 211 is a button for setting a new monitoring area. When the new monitoring area setting button 211 is indicated by a mouse or the like, a new monitoring area setting screen 220 shown in FIG. 5(B) is displayed.

The monitoring area setting change button 212 is a button for changing a set value which is set as for an already set monitoring area. The monitoring area deleting button 213 is a button for deleting a set value which is set as for an already set monitoring area. The monitoring area setting change and the monitoring area deletion mean that data which are set as for a monitoring area specified by inputting a name of a monitoring area are changed or deleted. Here, these processes are not explained in detail.

As shown in FIG. 5(B), the new monitoring area setting screen 220 includes an angle of view setting button 221, a name setting button 222, a finding method setting button 223, a tracking method setting button 224, a circulating method setting button 225, a recording post setting button 226 and a back button 227.

The angle of view setting button 221 is a button for calling an angle of view setting screen 230 shown in FIG. 5(C). The name setting button 222 is a button for calling a name setting screen 240 shown in FIG. 5(D). The finding method setting button 223 is a button for calling a finding method setting screen 250 shown in FIG. 5(E). The tracking method setting button 224 is a button for calling a tracking method setting screen 260 shown in FIG. 5(F). The circulating method setting button 225 is a button for calling a circulating method setting screen 270 shown in FIG. 5(G). The recording post setting button 226 is a button for calling a recording post setting screen 280 shown in FIG. 5(H). When the back button 226 is indicated by a pointer such as a mouse, the monitoring area editing screen 210 shown in FIG. 5(A) is displayed.

As shown in FIG. 5(C), the angle of view setting screen 230 includes an area 231 for displaying an area name, an area 232 for displaying a message, an OK button 233, and a back button 234. A name to be given to a monitoring area is displayed on the area 231 for displaying an area name. When a name is not yet given to the monitoring area, nothing is displayed. A name to be given to the monitoring area is a name which is given to an image capturing area (monitoring area) determined by an angle of view set at step S01, and when the user inputs a name into the name setting screen 240, mentioned below, the name is determined.

A message "Set the current angle of view on the monitoring area?" is displayed on the area 232. This is a message which asks the user if the image capturing area determined on an image displayed on the area 201 is set as the monitoring area on the remote control screen 200. In this state the pan buttons 203A and 203B, the tilt buttons 204A and 204B and the zoom buttons 205A and 205B of the remote control screen 200 are operated so that the monitoring area can be changed. When the OK button 233 of the angle of view setting screen 230 is indicated by a mouse or the like at the stage that the desired monitoring area is displayed on the area 201, an image capturing area determined by a current angle of view is determined as the monitoring area (step S11 in FIG. 3).

When the back button 234 is indicated by a mouse or the like, the new monitoring area setting screen 220 shown in FIG. 5(B) is displayed.

As shown in FIG. 5(D), the name setting screen 240 includes an area 241 for showing a name of a monitoring area, an area 242 for displaying a message "Set a name", an area 243 for inputting a name of the monitoring area, an OK button 244 and a back button 245. A name which is given to the monitoring area to be currently processed is displayed on the area 241. When a name is not yet given to the monitoring area, nothing is displayed. When a name is not yet given to the monitoring area, a message "Set a name" is displayed on the area 242. When a name is already given, its name is displayed on the area 241, and a message "Change the name?" or the like is displayed on the area 242.

The name which is to be given to the monitoring area set on the angle of view setting screen 230 is input in the area 243. The user inputs a desired name so as to be capable of giving the name to the monitoring area. When the OK button 244 is indicated by a mouse or the like, the name input in the area 243 is set as the name of the monitoring area (step S12 in FIG. 3). When the back button 245 is indicated by a mouse or the like, the new monitoring area setting screen 220 shown in FIG. 5(B) is displayed.

As shown in FIG. 5(E), the finding method setting screen 250 includes an area 251 for displaying a name of a monitoring area, an area 252 for selecting the color extraction image process as the finding method, an area 253 for selecting the time difference image process, an area 254 for selecting the background difference image process, a save button 255 and a back button 256.

A name which is given to a monitoring area to be currently processed is displayed on the area 251. The area 252 displays "Color extraction" and is a button for selecting the color extraction image process. When the area 252 is indicated by a mouse or the like, a check box displayed on its left side is reversely displayed, so that the color extraction image process is selected as the finding method. Similarly, the area 253 displays "time difference" and is a button for selecting the time difference image process. When the area 253 is indicated by a mouse or the like, the time difference image process is selected as the finding method, and a check box on its side is reversely displayed so that the time difference image process is selected as the finding method.

The area 254 displays "background difference" and is a button for selecting the background difference image process. When the area 254 is indicated by a mouse or the like, the background difference image process is selected as the finding method, and a check box on its side is reversely displayed so that the background difference image process is selected as the finding method.

In the setting of the finding method, at least one of the color extraction image process, the time difference image process and the background difference image process can be selected, and a plurality of them may be selected. For example, the color extraction image process and the background difference image process can be selected. When the save button 255 is indicated by a mouse or the like, the finding methods which are specified on the areas 252, 253 and 254 are set (step S13 in FIG. 3).

As shown in FIG. 5(F), the tracking method setting screen 260 includes an area 261 for displaying a name of a monitoring area, an area 262 for selecting the color extraction image process as the tracking method, an area 263 for selecting time difference image process as the tracking method, an area 264 for selecting the background difference image process as the tracking method, an area 265 for not selecting the tracking method, a save button 266 and a back button 267.

A name which is given to the monitoring area to be currently processed is displayed on the area 261.

The word "color extraction" is displayed on the area 262. When the area 262 is indicated by a mouse or the like, the color extraction image process is selected as the tracking method, and a check box on the left is reversely displayed so that the color extracting process is selected as the tracking method.

The word "time difference" is displayed on the area 263. When the area 263 is clicked by a mouse or the like, the time difference image process is selected as the tracking method, and a check box on the left is reversely displayed so that the time difference image process is selected as the tracking method.

The word "background difference" is displayed on the area 264. When the area 264 is indicated by a mouse or the like, the background difference image process is selected as the tracking method, and a check box on the left is reversely displayed so that the background difference image process is selected as the tracking method.

"No tracking" is displayed on the area 265. When the area 265 is indicated by a mouse or the like, any image process is not selected as the tracking method, and a check box is reversely displayed. In this case, when any tracking method is selected, all of them are canceled.

When the save button 266 is indicated by a mouse or the like, the tracking methods which are specified on the areas 262, 263, 264 and 265 are related to the monitoring area corresponding to the name displayed on the area 261 so as to be set (step S14 in FIG. 3).

Meanwhile, when the back button 267 is indicated by a mouse or the like, the new monitoring area setting screen 220 shown in FIG. 5(B) is displayed.

As shown in FIG. 5(G), the circulating method setting screen 270 includes an area 271 for displaying a name of a monitoring area, an area 272 for inputting time for specifying, an area 273 for inputting interval time, an area 274 for inputting an order of circulation, an area 275 for displaying names of monitoring area set for the circulation orderly, a save button 276 and a back button 277.

The circulating method setting screen 270 is a screen for setting the circulating method for each monitoring area. The circulating method includes a time specifying mode for monitoring a monitoring area at predetermined time, an interval mode for monitoring a monitoring area at predetermined time intervals, and a sequence mode for monitoring the plural predetermined monitoring areas orderly.

A name of a monitoring area to be currently processed is displayed on the area 271 of the circulating method setting screen 270.

When the area 272 is indicated by a mouse or the like, the time specifying mode is set as the circulating method, so that the monitoring time can be input. Thereafter, a check box on the left side of the area 272 is reversely displayed so that the time specifying mode is set. The circulating method is set by this setting so that the monitoring area with the name displayed on the area 271 are monitored at the time input onto the area 272.

When the area 273 is indicated by a mouse or the like, the interval mode is set as the circulating method, so that predetermined time interval can be input. Thereafter, a check box on the left side of the area 273 is reversely displayed so that the interval mode is set. The circulating method is set by this setting so that the monitoring area with the name displayed on the area 271 is monitored at the time interval input into the area 273.

When the area 274 is indicated by a mouse or the like, the sequence mode is set as the circulating method, so that an order can be input into the area 274. The names of the monitoring areas which are set by the sequence mode are displayed on the area 275 in the set order. A check box on the left side of the area 274 is reversely displayed so that the sequence mode is set. The circulating method is set by this setting so that the monitoring areas with the names displayed on the area 271 are monitored in the order of inputting into the area 274.

When the save button 276 is indicated by a mouse or the like, the circulating methods specified on the areas 272, 273 and 274 are related to the monitoring areas corresponding to the names displayed on the area 271 so as to be set (step S15 in FIG. 3).

Meanwhile, when the back button 277 is indicated by a mouse or the like, the new monitoring area setting screen 220 shown in FIG. 5(B) is displayed.

At least one circulating method may be set for one monitoring area, or a plurality of circulating methods may be set. For example, the monitoring using the time specifying mode and the monitoring using the interval mode can be set. In this case, a monitoring area is monitored with predetermined time intervals and also at specified time.

As shown in FIG. 5(H), the recording and notifying setting screen 280 includes an area 281 for displaying a name of a monitoring area, buttons 282A and 282B for setting whether detailed image capturing is carried out, buttons 283A and 283B for setting whether the notifying of finding an object is carried out, a save button 284 and a back button 285.

A name of a monitoring area to be set is displayed on the area 281. The buttons 282A and 282B are buttons for, in the case where an object is found in a monitoring area, setting as to whether an image of the object is captured amply. When the button 282A is selected, "Detailed image capturing" is set. When the button 282B is specified, "No detailed image capturing" is set (step S16 in FIG. 3).

The buttons 283A and 283B are buttons for, in the case where an object is found in a monitoring area, setting as to whether this is notified. When the button 283A is specified, the notifying is set, and when the button 283B is set, an non-notifying mode is set (step S16 in FIG. 3).

The angles of view, names, finding methods, tracking methods, circulating methods, recording mode and notifying mode of a monitoring area which are set at steps S11 through S16 are related one another so as to stored in the storage unit 109 (step S17 in FIG. 3).

When the monitoring apparatus 100 is remotely operated from the PC 131 connected with the LAN 130, the set contents of the monitoring apparatus 100 can be set. In the present embodiment, the modes are set by remote operation from the PC 131, but they may be set by inputting directly from an input device such as a key board of the monitoring apparatus 100.

Figure 6:
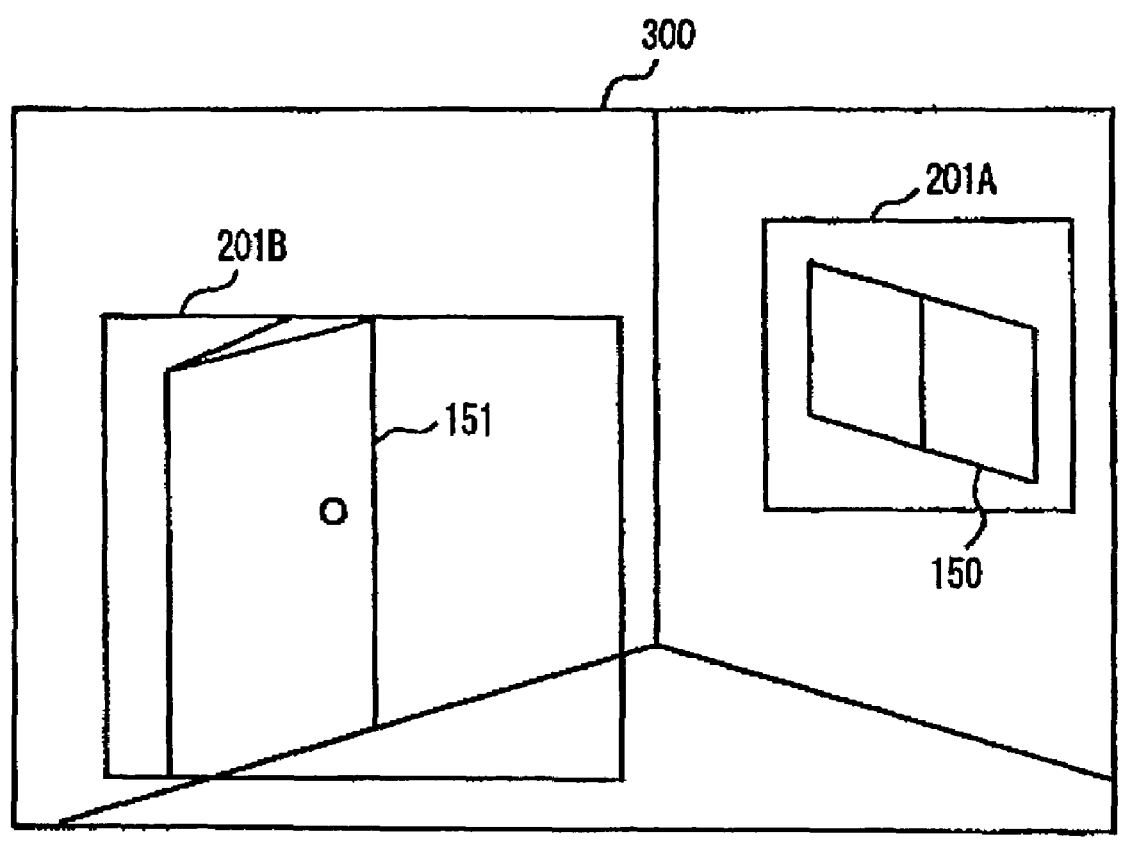
FIG. 6 is a diagram for explaining a relationship between an image capturing possible range and a monitoring area of the monitoring apparatus.

FIG. 6 is a diagram for explaining a relationship between an image capturing possible range and a monitoring area of the monitoring apparatus 100. With reference to FIG. 6, the image capturing possible range 300 shows a range which can be captured by the camera head 120 in the case where the monitoring apparatus 100 is installed in a certain room. Moreover, the image capturing possible range 300 is a range which can be captured by CCD provided to the lens 123 by maximally driving the pan-tilt driving mechanism 121 and the lens driving mechanism 122 using the camera head 120.

FIG. 6 shows two monitoring areas 201A and 201B. The monitoring area 201A includes a window 150. Therefore, in the case where a person tries to intrude from the window 150, the intruder is included in the monitoring area 201A. The monitoring area 201B is set as an area including a door 151. In the case where a person tries to intrude from the door 151, the intruder is included in the monitoring area 201B. Therefore, an intruder from the door 151 into the room can be monitored on the monitoring area 201B.

Figure 7:
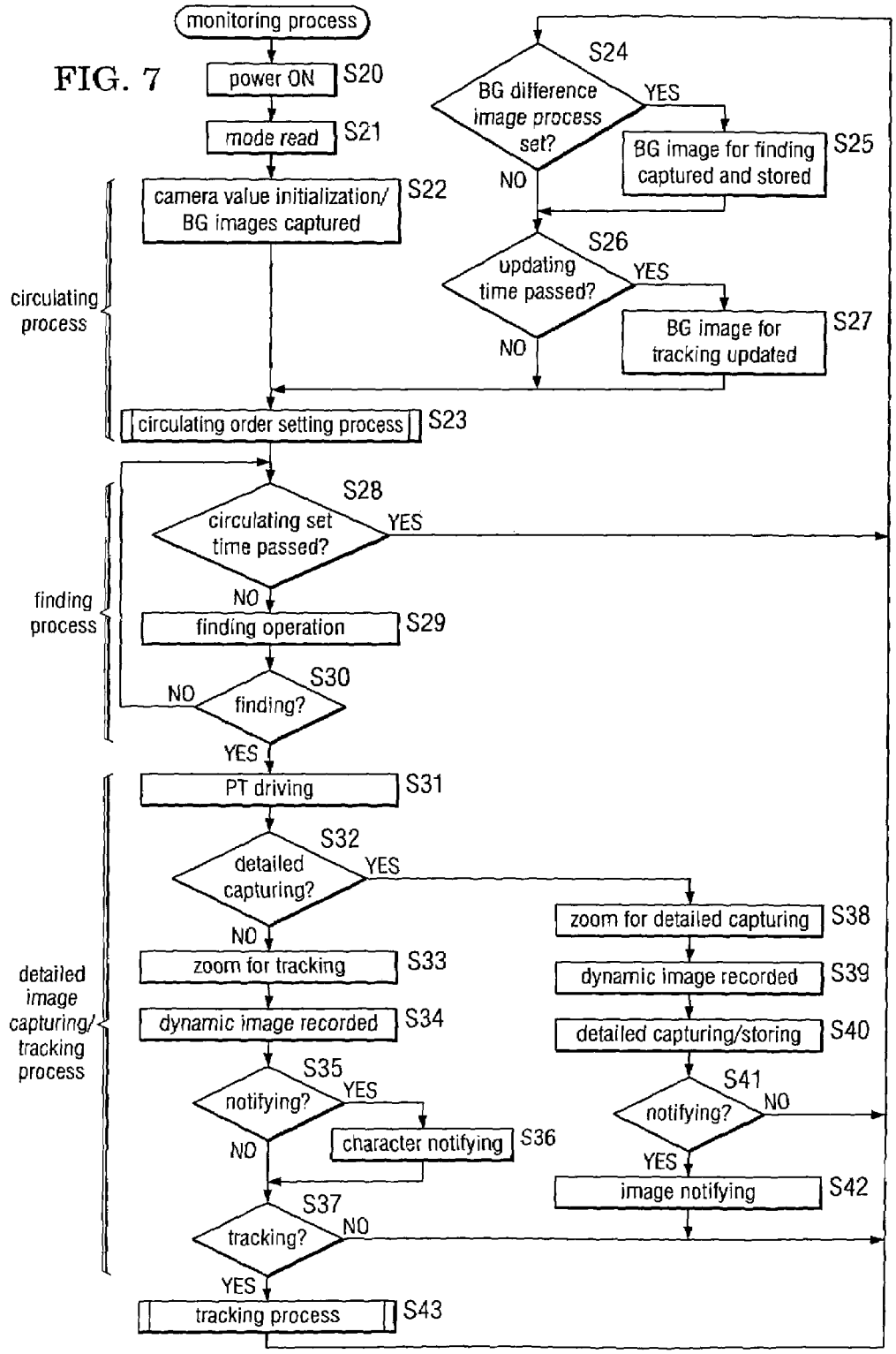
FIG. 7 is a flowchart showing a flow of a monitoring process to be executed by the monitoring apparatus according to the present embodiment.

FIG. 7 is a flowchart showing a flow of the monitoring process to be executed by the monitoring apparatus 100 in the present embodiment. When the power of the monitoring apparatus 100 is turned on (step S20), the setting mode stored in the storage unit 109 is read (step S21). The setting mode is set by the remote operating process shown in FIGS. 2 and 3.

At step S22, a value such as a camera numerical value of the camera head 120 is set to the initial value, and a background image for tracking and a background image of a circulating point are captured.

The background image for tracking is an image which is used in the tracking method of the background difference image process. The background image for tracking is obtained by previously dividing an image capturing possible range by the camera head 120 into a plurality of background areas and capturing images of the divided background areas. Moreover, the background image of a circulating point is an image which is obtained by capturing an image of a monitoring area in the case where the background image difference process is set as the finding method of the monitoring area. The background image for tracking and the background image of a circulating point are used later as images to be the bases of the finding process and the tracking process.

At next step S23 a circuiting order setting process is executed. The circulating order setting process is for determining monitoring areas to be monitored next in the case where a plurality of monitoring areas are set. This will be detailed later. The monitoring area to be processed is determined by executing the process at step S23, and the process goes to step S28.

At step S28 a judgment is made as to whether circulating set time has passed in the monitoring area to be processed, and when the time has passed, the process goes to step S24, and when not, goes to step S29. The circulating set time is time which is allocated to execute the finding process (steps S29 and S30) for the monitoring area to be processed. The circulating set time is previously set so as to be stored in the storage unit 109.

At step S29 the finding operation is performed according to the finding method which is set for the monitoring area. The finding method includes the three methods: the color extraction image process; the time difference image process; and the background difference image process. The finding method is set on the finding method setting screen 250 shown in FIG. 5(E) for the monitoring area. The monitoring apparatus 100 selects the finding method which is set for the monitoring area from the color extraction image process, the time difference image process and the background difference image process. The finding operation is performed by using the selected finding method. In the case where a plurality of finding methods are set, the respective finding methods are selected successively, so that the finding operations are performed successively. In the finding operation, a change area which changes in the monitoring area is detected. The change area is an area having a specified color in the color extraction image process, and an area of a moving object in the time difference image process, and an area which is different from a background image in the background difference image process.

At step S30 as a result of the finding operation performed at step S29, a judgment is made as to whether the change area is detected (found). When the change area is detected, the process goes to step S31, and when not, returns to step S28. Therefore, during the circulating set time, the finding operation is repeated.

At step S31 the pan-tilt driving mechanism 121 is driven so that a center of the finding area found at step S29 becomes a center of the image capturing area of the camera. Thereafter, a judgment is made as to whether the detailed image capturing is executed (step S32). When the detailed image capturing is set, the process goes to step S38, and when not, goes to step S33.

At step S33 the PTZ control section 106 controls the zoom driving mechanism 122, so that a zoom amount is changed so that the lens is pantoscopic. This is because the image capturing area is made to be as large as possible so that a moving object can be easily captured in the image capturing area.

At step S34 dynamic images from the determination of the monitoring area at step S23 to the current time or the oldest image in the monitoring area recorded in the image recording section 104 through the current dynamic image are stored in the storage unit 109.

At next step S35 a determination is made as to whether the notifying is carried out. The notifying or non-notifying is set on the recording and notifying setting screen 280. The notifying when the detailed image capturing is not executed is limited to the notifying using characters.

At step S36 character information is notified. Here, the notifying is a process for transmitting about, for example, an intruder in the form of an e-mail via the external communication section 107. The e-mail may be transmitted from the external communication section 107 to a mobile phone owned by a user. As a result, the user receives the e-mail so as to be capable of knowing about the intruder in a place where the user has gone.

At next step S37 a judgment is made as to whether tracking is executed. As to whether tracking or not is set on the tracking method setting screen 260. When no tracking is set, the process goes to step S24, and when not, goes to step S43. At step S43 the set tracking process is selected so as to be executed. The tracking method includes the three methods: the color extraction image process; the time difference image process; and the background difference image process. The tracking method is set on the tracking method setting screen 260 shown in FIG. 5(F) for a monitoring area. The monitoring apparatus 100 selects the tracking method which has been set for the monitoring area from the three finding methods: the color extraction image process, the time difference image process; and the background difference image process. The tracking process is executed by using the selected tracking method.

Meanwhile, when the detailed image capturing is set to be executed at step S32, the process goes to step S38, and a zooming operation is performed so that the finding area has a predetermined ratio in the captured image. The zooming operation is performed in such a manner that the zoom driving mechanism 122 is controlled by the PTZ control section 106. The predetermined ratio of the finding area in the captured image which determines the zoom magnification is previously stored in the storage unit 109.

At step S39 dynamic images from the determination of the monitoring area at step S23 to the current time or the oldest image in the monitoring area recorded in the image recording section 104 through the current dynamic images are stored in the storage unit 109.

At next step S40 a still image is captured in order to capturing an image of the finding area amply, and the captured still image is stored in the storage unit 109. Differently from the dynamic image stored at step S39, the still image is stored at step S40 because resolution of the dynamic image is different from resolution of the still image, namely, the resolution of the still image is higher than that of the dynamic image, and thus the still image can be recorded more amply than the dynamic image.

Next, a judgment is made as to whether the still image captured amply is notified to the user (step S41). When the judgment is made that the detailed image capturing is notified, the process goes to step S42, when not, goes to step S24. This judgment is made based on the data set on the recording and notifying setting screen 280. On the recording and notifying setting screen 280 in FIG. 4(H), when the button 283A is indicated by the remote operation of the user, the notifying of detailed image capturing is set, and when the button 283B is indicated, non-notifying of detailed image capturing is set.

At step S42 the still image which has been captured and saved at step S40 is attached to an e-mail or the like so as to be transmitted to the user by the external communication section 107. As a result, the user watches the received e-mail and the still image attached to the e-mail so as to know about an intruder and be capable of viewing the image including the intruder.

At steps S24 through S27 when the finding process executed at steps S28 through S30, the watching process executed at step S31 through S42 or the tracking process executed at step S43 is ended, a judgment is made as to whether the background difference image process is set as the finding method of the monitoring area to be currently processed. When the background difference image process is set, the process goes to step S25, and when not, goes to step S26.

At step S25 the PTZ control section 160 controls the pan-tilt driving mechanism 121 and the zoom driving mechanism 122 so that the monitoring area to be processed becomes an image capturing area. An image of the monitoring area to be processed is captured so as to be stored as a background image in the image storage section 104. The background image is updated occasionally in such a manner, thereby making it possible that the background image is hardly influenced by a change in the environment.

At step S26 a judgment is made as to whether background difference tracking image updating time has passed. When the time has passed, the process goes to step S27, and when not, goes to step S23. The background difference tracking image updating time is previously set in order to update a background image to be used in the case where the background difference image process is selected as the tracking method. This is because in the case where background difference image process is used for the tracking operation, a background image is updated to be as new as possible.

At step S27 a background image for tracking is updated. The PTZ control section 106 controls the pan-tilt driving mechanism 121 and the zoom driving mechanism 122 so that background images are captured successively.

Figure 8:
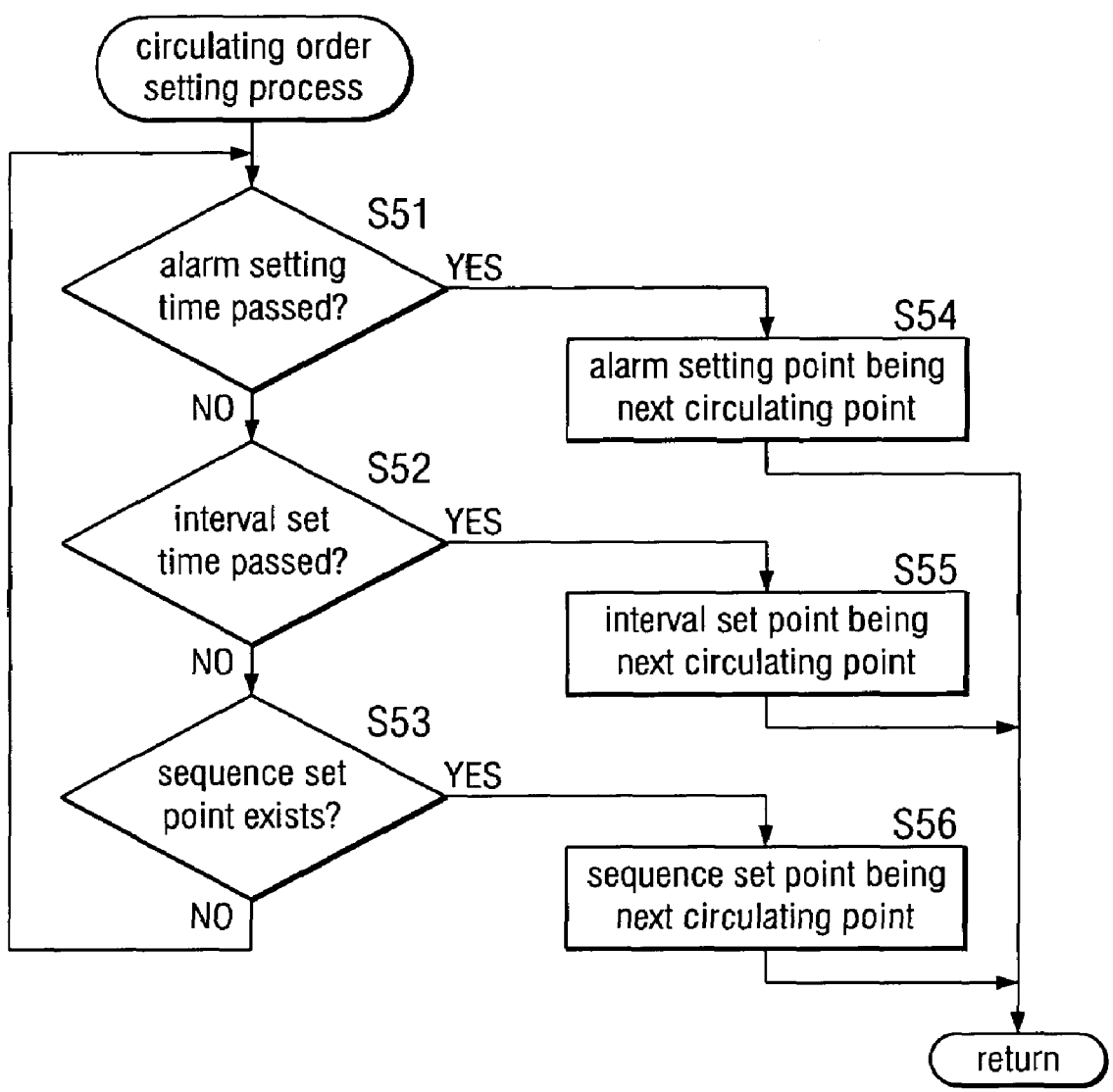
FIG. 8 is a flowchart showing a flow of a circulating order setting process to be executed at step S23 in FIG. 7.

FIG. 8 is a flowchart showing a flow of the circulating order setting process to be executed at step S23 in FIG. 7. In the circulating order setting process, a judgment is made as to whether alarm setting time has passed (step S51). The alarm setting time is specified in the case where the time specifying mode is set as the circulating method. The specified time is input into the area 272 of the circulating method setting screen 270 in FIG. 5(G) by the remote control of the user.

When the judgment is made that the alarm setting time has passed, the process goes to step S54, and when not, goes to step S52. At step S54 an alarm setting point is a next circulating point. The alarm setting point is a monitoring area where the time specifying mode is set as the circulating method. The alarm setting point becomes an object to be monitored next.

At step S52 a judgment is made as to whether an interval set time has passed. When the interval set time has passed, the process goes to step S55, and when not, goes to step S53. The interval set time is a time interval which is set in the case where the interval mode is set as the circulating method. The interval time is a time interval which is input into the area 273 of the circulating method setting screen 270 in FIG. 5(G) by the remote operation of the user.

At step S55 an interval set point is a next circulating point. The interval set point is a monitoring area where the interval mode is set as the circulating method and the interval set time has passed. The interval set point is to be monitored next.

At step S53 a judgment is made as to whether the sequence set point exists. When the judgment is made that the sequence set point exists, the process goes to step S56, and when not, goes to step S51. The sequence set point is a next monitoring area where the sequence mode is set as the circulating method. The order in the sequence mode is an order which is input into the area 274 of the circulating method setting screen 270 in FIG. 5(G) by the user.

At step S56 the sequence set point is a next circulating point (a monitoring area to be processed next).

Figure 9:
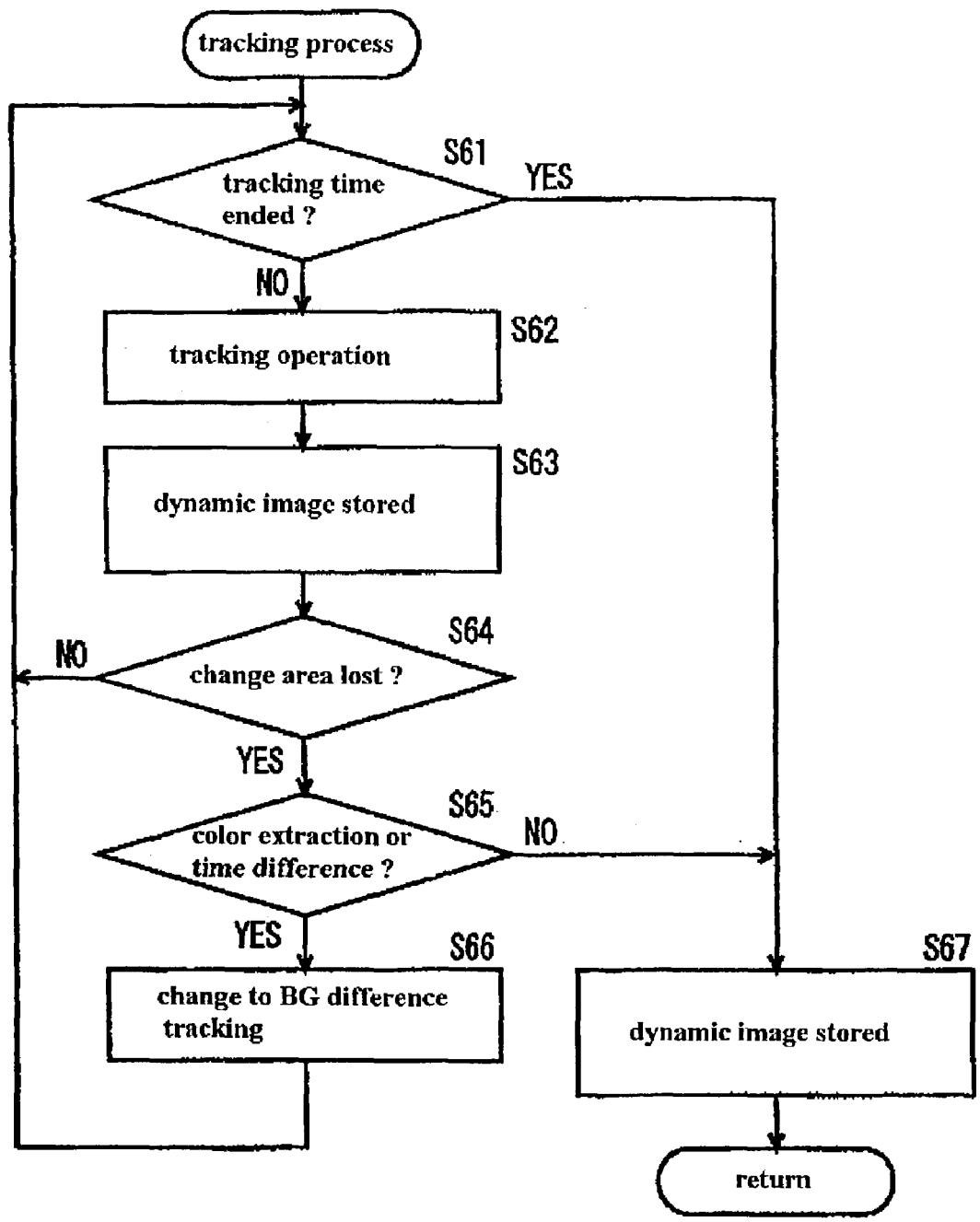
FIG. 9 is a flowchart showing a flow of a tracking process to be executed at step S43 in FIG. 7.

FIG. 9 is a flowchart showing a flow of the tracking process to be executed at step S43 shown in FIG. 7. In the tracking process a judgment is made as to whether the tracking time is ended (step SG1). The tracking time is time for which the tracking process continues and is previously set by the user to be stored in the storage unit 109. When the tracking time has passed, the process goes to step S67, and when not, goes to step S62. At step S62 the tracking operation is performed. The tracking operation is a process for finding a moving object and predicting a moving direction of the object and moving the image capturing range of the camera. The moving object is detected as a change area in the image.

At step S63 a dynamic image which has been captured by CCD of the camera head 120 within predetermined time after the tracking operation is executed is stored in the storage unit 109 (step S63).

At next step S64 a judgment is made as to whether the change area (object) is lost. In the finding operation, the change area in the image is detected so that an area of the moving object is found. Therefore, at the time when the change area cannot be detected from the image, a judgment is made that the area of the moving object is lost. When the moving object is lost, the process goes to step S65, and when not, returns to step S61.

At step S65 a judgment is made as to whether the tracking method is the color extraction image process or the time difference image process. When so, the process goes to step S66, and when not, goes to step S67.

At step S66 the tracking method is changed into the background difference image process so that the tracking process is continued. For example, in the case where the tracking method is executed by the color extraction image process where a skin color is set as a specified color, at the time when a person intrudes into the monitoring area while his/her face is facing the camera, the intruder is detected. If the intruder notices the camera and looks behind, the image of the face is not captured but the image of the hair is captured. In this case, the skin color disappears from the image and although the intruder is in the monitoring area, the skin color area cannot be extracted.

In addition, in the case of the time difference image process, when an object moves to a direction which crosses an optical axis of the lens 123, the object can be tracked. However, when the object moves to a direction which is parallel with the optical axis of the lens 123, for example, the object moves to a direction which is separated from or is closer to the lens 123, since a fluctuation in the change area is small, it is difficult to detect the object. Moreover, similarly when the object is still, although the object exists in the monitoring area, the object cannot be detected.

On the contrary, in the case of the background difference image process, since an image which is captured before an object intrudes is compared with an image which is captured after the object intrudes, the intruder can be extracted securely. Therefore, in the case where an object which is found in the color extraction image process or the time difference image process is lost, the tracking operation is performed using the background difference image process so that the moving object can be tracked secured.

Further at step S67 the dynamic image which is captured within the predetermined time before the process goes to step S67 is stored in the storage unit 109. As such a dynamic image, for example, all the past images recorded in the image recording section 104 may be recorded. Dynamic image before predetermined time are recorded in such a manner, the images which have been obtained by capturing an image of the monitoring area before the object is lost can be recorded. For this reason, the direction to which the object moves in the monitoring area can be recorded.

There will be explained below the time difference tracking process. The time difference image process is the tracking process which is executed by the tracking method using the time difference image process.

Figure 10:
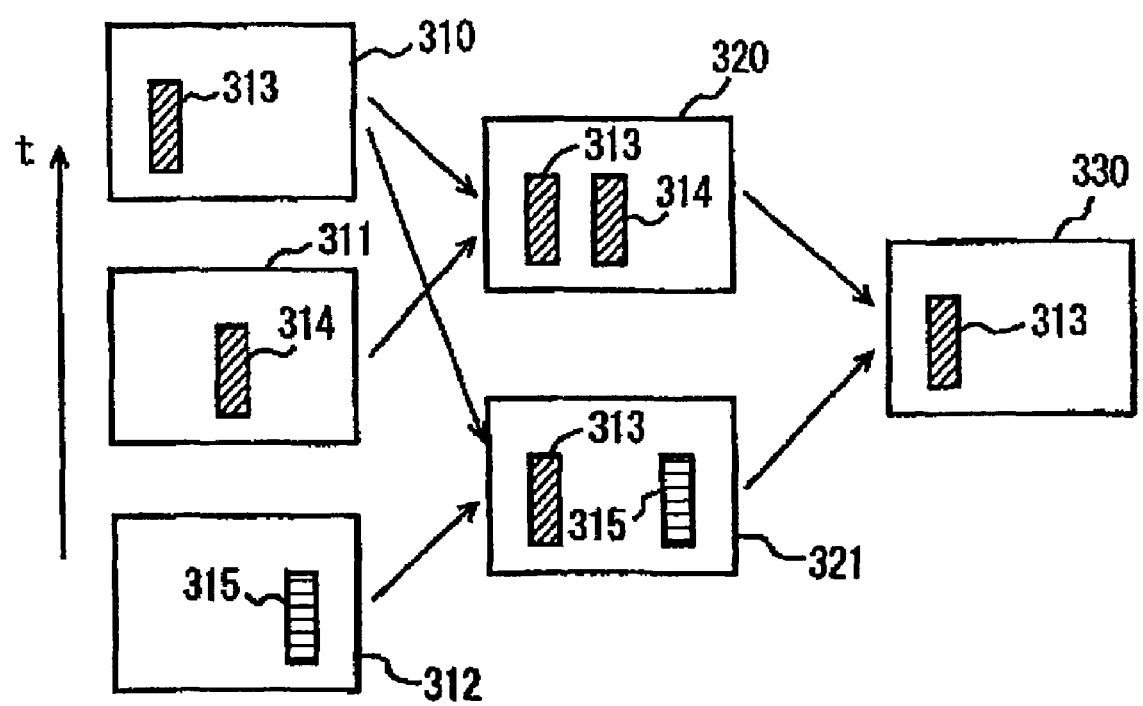
FIG. 10 is a diagram for explaining a process for extracting a change area in one of the time difference image process.

FIG. 10 is a diagram for explaining one example of the process for extracting a change area of the time difference image process. The time difference image process detects a change area from three images obtained by capturing an image of the image capturing area at different times. With reference to FIG. 10, the change area is extracted by using the three images: a current image 310; an image 311 which has been captured before the current image 310; and an image 312 which has been captured before the image 311.

The image 310 includes an area 313 showing a moving object. However, an area 313 showing the moving object cannot be extracted from the image 310. The image 311 includes an area 314 showing the moving object. The image 312 includes an area 315 showing the moving object. The areas 313 and 314 show the same object, but since the images of them are captured at the different times, the position of the object differs in the images 310 and 311. A difference between the images 316 and 311 is obtained, so that a difference image 320 is obtained. The difference image 320 includes areas 313 and 314. The area 313 in the difference image 320 shows the moving object and exists in a position at the time point of capturing the image 310. The area 314 in the difference image 320 shows the moving object and exists in a position at the time point of capturing the image 311. Next, a difference image 321 between the images 310 and 312 is obtained. The difference image 321 includes areas 313 and 315. The area 313 in the difference image 321 shows the moving object and exists in a position at the time point of capturing the image 310. The area 315 in the difference image 321 shows the moving object and exists in a position at the time point of capturing the image 312.

Next, AND of the difference images 320 and 321 is obtained so that an image 330 is obtained. As a result, the image 330 includes only the area 313 showing the moving object at the time point of capturing the image 310.

In such a manner, the change area 313 showing the moving object can be obtained from the image 310 by using the three images: the current image 310, the image 311 before the present; and the image 312 before the image 311.

Figure 11:
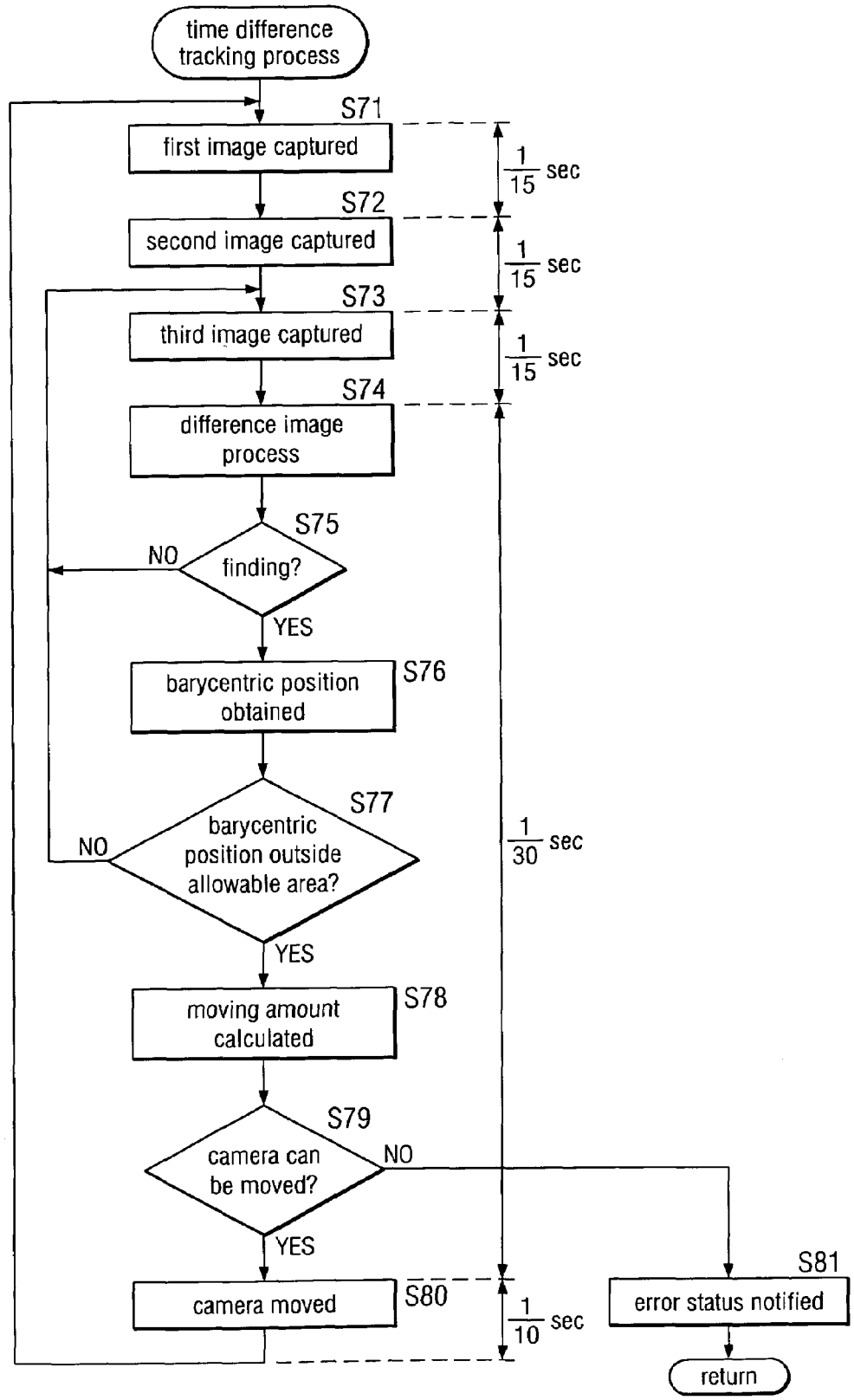
FIG. 11 is a flowchart showing a flow of the time difference tracking process to be executed by the monitoring apparatus according to the present embodiment.

FIG. 11 is a flowchart showing a flow of the time difference tracking process to be executed by the monitoring apparatus according to the present embodiment. In the time difference tracking process, the first image is captured. The second image is captured when 1/15 seconds pass after the image is captured at step S71. Further, the third image is captured when 1/15 seconds pass after step S72 (step S73).

At next step S74 the above-mentioned difference image process shown in FIG. 10 is executed so that the change area is extracted.

At step S75 in the case where the change area is extracted, a judgment is made that it is found. When it is found, the process goes to step S76, and when not, returns to step S73 so that next images are captured successively.

At step S76 a barycentric position of the change area is obtained, and a judgment is made as to whether the obtained barycentric position is outside an existence allowable area (step S77). When the barycentric position is outside the existence allowable area, the process goes to step S78, and when not, goes to step S73.

The existence allowable area is previously set in a vicinity of the center of the image capturing range. When the barycentric position deviates from the existence allowable area, it is necessary to move the camera, and thus a moving amount of the camera is calculated (step S78).

A judgment is made as to whether the camera can be moved by the calculated moving amount (step S79), and when possible, the process goes to step S80, and when impossible, goes to step S81.

At step S80 the PZT control section 106 controls the pan-tilt driving mechanism 121 so as to move the image taking direction of the camera.

Meanwhile, at step S81 since the camera cannot be moved, an error status is notified to the CPU 102. Thereafter, the process is ended.

The color extraction tracking process is executed by the tracking method using the color extraction image process. In the color extraction tracking process, instead that the moving object is extracted as the-change area by using the three images at steps S71 through S74 in the time difference tracking process shown in FIG. 11, an area including a preset specified color is extracted from a captured image and the extracted area of the specified color is a change area. Since the other parts of process are the same as those in the time difference tracking process shown in FIG. 11, the description thereof is not repeated here.

Figure 12A:
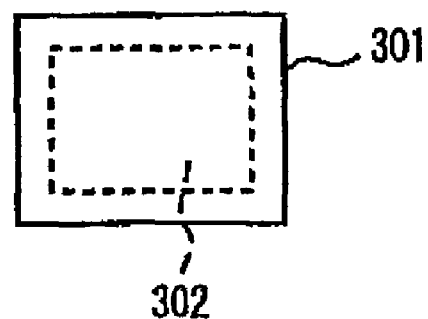
FIGS. 12(A) and 12(B) are diagrams for explaining a background image to be used in the background difference tracking process.
Figure 12B:
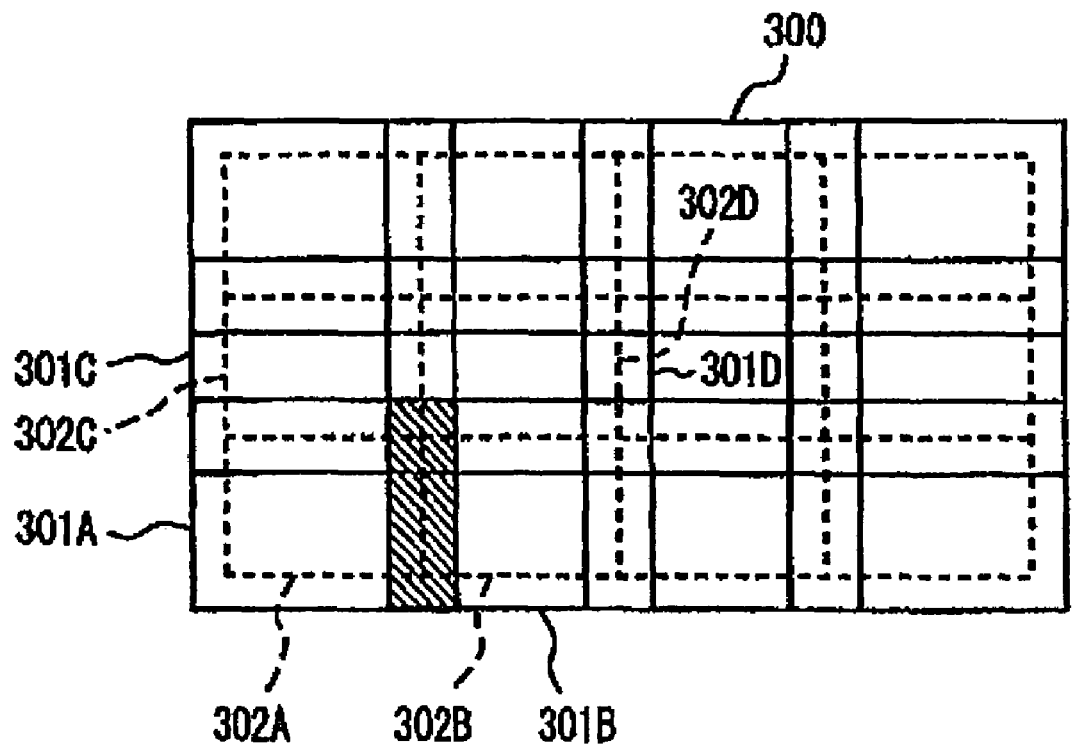

There will be explained below the background difference tracking process. The background difference tracking process is executed by the tracking method using the background difference image process. FIGS. 12(A) and 12(B) are diagrams for explaining background images to be used in the background difference tracking process to be executed by the monitoring apparatus according to the present embodiment. FIG. 12(A) is a diagram showing a background area and the existence allowable range, and FIG. 12(B) is a diagram showing a relationship between the background area and the image capturing possible range of the camera.

As shown in FIG. 12(A), the background area 301 shows a range where one-time image capturing by means of the camera 120 is possible. The background area 301 includes an existence allowable area 302. The existence allowable area 302 is previously set in the background area 301.

As shown in FIG. 12(B), a plurality of background areas are arranged on the image capturing possible range 300 by the camera so as to be superposed on each other between the adjacent background areas. Moreover, the existence allowable area included in each background area is not superposed on the existence allowable area of the adjacent background areas but they are come in contact with each other. For example, although a background area 301A and a background area 301B are overlapped with each other at portions to be subject to hatching, existence allowable areas 302A and 302B are not overlapped but their sides come in contact with each other.

The background area and the existence allowable area are arranged in such a manner, so that an object within the image capturing possible range by the camera exists in one of existence allowable areas except for some areas in a vicinity of the image capturing range. Therefore, the image capturing range of the camera is switched to the background area including the existence allowable area including the change area, so that the change area can be tracked without taking the moving direction and the moving speed of the change area into consideration and without predicting the moving position of the change area.

In addition, the image capturing possible range by the camera is divided into plural parts, and a plurality of background areas are arranged with less overlapping, thereby reducing a capacity for recording background images obtained by capturing an image in background areas.

Figure 13:
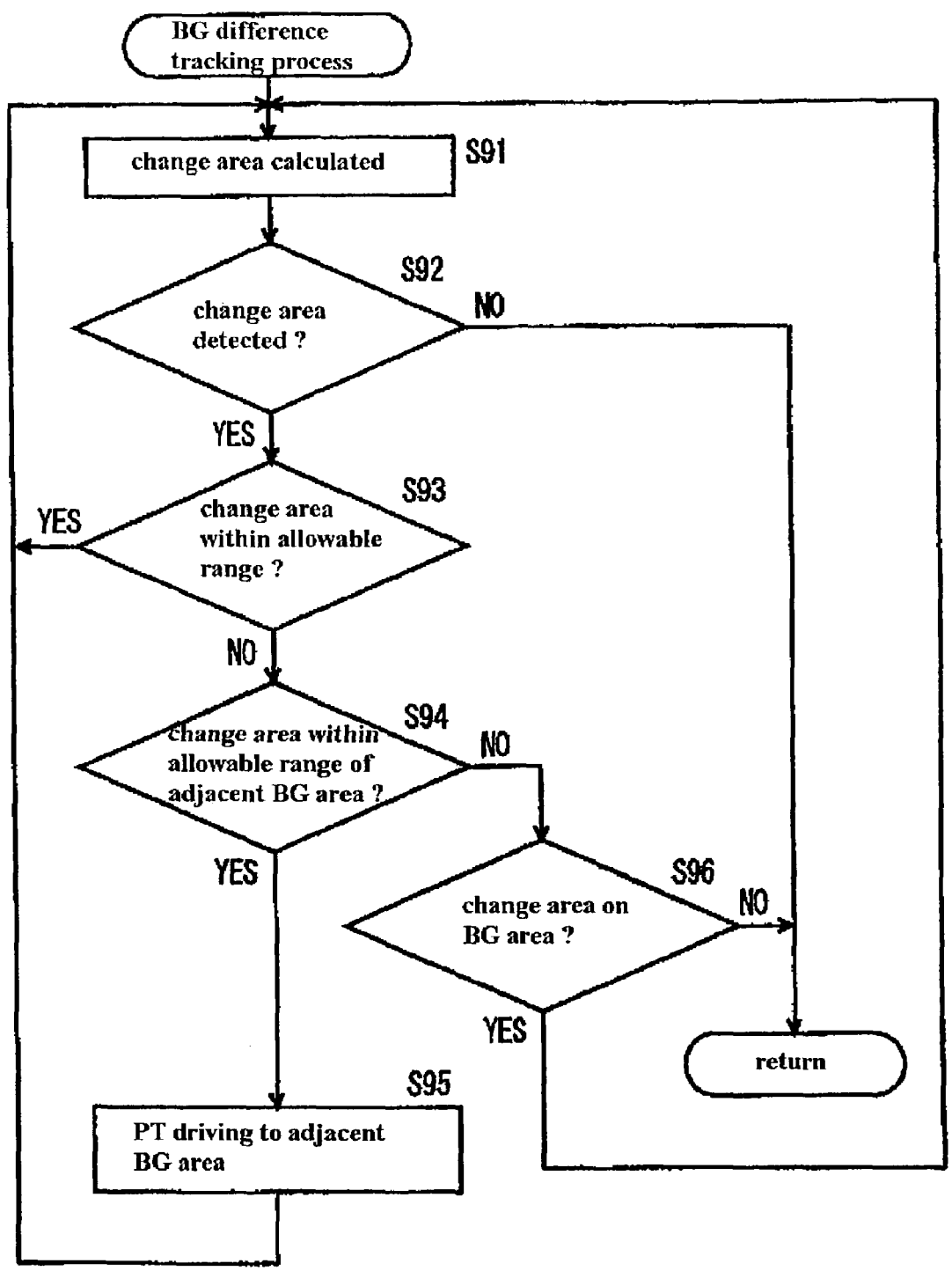
FIG. 13 is a flowchart showing a flow of the background difference tracking process to be executed by the monitoring apparatus according to the present embodiment.

FIG. 13 is a flowchart showing the background difference tracking process to be executed by the monitoring apparatus according to the present embodiment. With reference to FIG. 13, the background difference tracking process calculates a change area from a background image using the background difference image process (step S91). At step S92 a judgment is made as to whether the change area can be detected. When the change area can be detected, the process goes to step S93, and when not, the process is ended.

At step S93 a judgment is made as to whether the change area is within the existence allowable range in the background area. When the change area exists within the existence allowable area, the process returns to step S91 so as to be continued.

Meanwhile, when the change area does not exist within the existence allowable area, the process goes to step S94. At step S94 a judgment is made as to whether the change area exists within the existence allowable range of the adjacent background area. When the change area exists within the existence allowable range of the adjacent background area, the process goes to step S95, and when not, goes to step S96. At step S95 the PTZ control section 106 controls the pan-tilt driving mechanism 121 so that PT driving is executed in order to move the image capturing range of the camera to the adjacent background area. Thereafter, the process returns to step S91 so that the background difference tracking process is continued.

Meanwhile, at step S96 a judgment is made as to whether the change area exists on the background area. When the change area exists within the background area, the process returns to step S91 so that the tracking process is continued, and when not, the process is ended. The process goes to step S96 in the case where the change area is in a vicinity of the image capturing possible range by the camera and is outside the existence allowable range. In this case, since the adjacent background area does not exist, the image taking direction of the camera cannot be switched to that direction. Therefore, at step S96 in the case where the change area does not exist on the background area, the process is ended.

As explained above, in the monitoring apparatus 100 according to the present embodiment, one or a plurality of the color extraction image process, the time difference image process and the background difference image process can be set as the finding method for one monitoring area, so that a suitable finding method can be set according to the monitoring area. As a result, a change on the monitoring area can be found easily and accurately.

Further, since one of the color extraction image process, the time difference image process and the background difference image process can be set for each monitoring area in the tracking method, for example, a suitable tracking method can be set according to the object to be tracked. For this reason, an object can be tracked accurately.

Further, even in the case where the color extraction image process or the time difference image process is set as the tracking method, if an object to be tracked is lost, the tracking method is switched into the background difference image process so that the tracking is continued. The object can be tracked more securely.

Further, in the monitoring apparatus 100 according to the present embodiment, a background area where a monitoring area is divided into plural parts and overlapping is less is set. For this reason, since the background image is stored efficiently, the storage capacity is less.

Further, in the monitoring apparatus 100 according to the present embodiment, a background image to be used in the background difference tracking process is an image obtained by capturing an image of a predetermined background area. Namely, an existence allowable area is provided to a background area, and a background area is arranged so as to contact with an existence allowable area of a background area adjacent to an existence allowable area. In the case where a moving object extracted as a change area is tracked, the object as the change area can be tracked only by determining the image taking direction of the camera so that the background area where the existence allowable area includes the change area.

Further, in the case where the change area exists in the processing image but does not exist in the existence allowable area, the background area is changed. Accordingly, at the stage that the change area exists in the processing image, a background area to be changed next can be determined.

As a result, it is not necessary to predict a position of an object based on the moving direction and the moving speed of the moving object, so that the object can be tracked easily.

In the present embodiment, an intruder is found based on an captured image, but additionally an input signal from an external sensor is referred to. For example, a sensor for detecting opening/closing of a door of an entry, and when a signal from the sensor is input, the angle of the camera is controlled to the direction of the door, so that the process after step S31 in FIG. 7 may be executed.

The present embodiment explained the example of the monitoring apparatus, but the present invention can be devised as a monitoring method of executing the monitoring process shown in FIGS. 7, 8 and 9 or a monitoring program for allowing a computer to execute the monitoring process.

In this case, the monitoring method to be executed by the monitoring apparatus having image taking means for being capable of capturing images of a plurality of image capturing areas, includes the step of obtaining an image obtained by capturing images of the plural image capturing areas by means of the image taking means, and the step of selecting a detecting method for each of the plural image capturing areas from a plurality of detecting methods in order to detect a change area which changes with time based on the obtained image.

In addition, the monitoring program to be executed by the monitoring apparatus having image taking means for being capable of capturing images of a plurality of image capturing areas, includes the step of obtaining an image obtained by capturing images of the plural image capturing areas by means of the image taking means; and the step of selecting a detecting method predetermined for each of the plural image capturing areas from a plurality of detecting methods in order to detect a change area which changes with time based on the obtained image.

Although the present invention has been fully described by way of examples with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A monitoring apparatus comprising:
an image taking section which captures an image of a predetermined monitoring area;
a first angle of view control section which changes an angle of view of the image taking section so that said predetermined monitoring area is divided into a plurality of background areas and an image of each background area is captured by said image taking section;
a storage section which stores the image of each background area;
a change area obtaining section which obtains an object area nonexistent at the time of capturing the stored image of one background area based on the current image of said one background area and the stored image of the one background area; and
a second angle of view control section which changes an angle of view of the image taking section in order to capture an image of a background area adjacent to the one background area when the object area moves from the one background area toward the adjacent background area.

2. A monitoring apparatus as claimed in claim 1 wherein each of the plurality background areas has an existence allowable range and the plurality of the background areas are superposed by each other, and the existence allowable range of each background area contacts with the existence allowable range of an adjacent background area without superposing, and when the object area is in the existence allowable range of the adjacent background area, the second angle of view control section changes the angle of view of the image taking section in order to capture an image of the adjacent background area.

3. A monitoring method performed in a monitoring apparatus having an image taking section which outputs a captured image, said monitoring method comprising the steps of:
changing an angle of view of the image taking section so that a predetermined monitoring area is divided into a plurality of background areas;
capturing an image of each background area by the image taking section;
storing the image of each background area;
capturing an current image of one background area;
determining an object area nonexistent at the time of capturing the stored image of said one background area based on the current image of the one background area and the stored image of the one background area; and
changing the angle of view of the image taking section in order to capture an image of a background area adjacent to the one background area when the object area moves from the one background area toward the adjacent background area.

4. A monitoring method as claimed in claim 3 wherein each of the plurality background areas has an existence allowable range and the plurality of the background areas are superposed by each other, and the existence allowable range of each background area contacts with the existence allowable range of an adjacent background area without superposing, and said changing of the angle of view of the image taking section is performed in order to capture an image of the adjacent background area when the object area is in the existence allowable range of the adjacent background area.

5. A monitoring apparatus comprising:
an image taking device which is configured to capture images across a predetermined monitoring area;
a storage device which is configured to store images captured by the image taking device;
a control device which is configured to control at least one of a direction and a magnification of the image taking device, said control device being configured in a first mode to capture a plurality of background images across said predetermined monitoring area and to store said plurality of background images in said storage device, each of said plurality of background images covering a corresponding background area within said predetermined monitoring area; and
a detection device which is configured to receive from the image taking device a current image covering a first background area within said predetermined monitoring area, said current image being one that is taken after the corresponding one of said plurality of background images covering said first background area, and to detect in said current image, based on said current image and said corresponding one of said plurality of background images, an object area that was not present in the background image;
wherein said control device is further configured in a second mode to control at least one of a direction and a magnification of the image takiiig device so as to capture a new image corresponding to a second background area which is adjacent to said first background area when the object area moves from the first background area toward the second background area.

6. A monitoring apparatus as claimed in claim 5, wherein said control device is configured in said first mode to capture a plurality of background images such that said plurality of background images together substantially cover said predetermined monitoring area.

7. A monitoring apparatus as claimed in claim 6, wherein adjacent ones of said plurality of background images overlap portions of each other and wherein said control device is configured in said second mode to change at least one of a direction and a magnification of the image taking device and capture a new image corresponding to a second background area which is adjacent to said first background area when the object area detected within the current image is located at a position within the first background area that is overlapped by the adjacent background area.

8. A method of monitoring a monitoring area comprising the steps of:
- capturing a plurality of background images across said predetermined monitoring area, each of said plurality of background images covering a corresponding background area within said predetermined monitoring area;
- storing said plurality of background images;
- capturing a current image covering a first background area within said predetermined monitoring area, said current image being one that is taken after a corresponding one of said plurality of background images covering said first background area;
- detecting in said current image, based on said current image and said corresponding one of said plurality of background images, an object area that was not present in the background image;
- capturing, when an object area detected in said detecting step is determined to be located within the first background area at a peripheral area thereof, a new image corresponding to a second background area which is adjacent to said peripheral area of said first background.

9. A method of monitoring as claimed in claim 8, further comprising the step of detecting in said new image, based on said new image and one of said plurality of background images corresponding to said second background area, an object area that was not present in the background image for said second background area.

* * * * *